United States Patent [19]

Hirosawa et al.

[11] Patent Number: 5,687,313
[45] Date of Patent: Nov. 11, 1997

[54] CONSOLE APPARATUS FOR INFORMATION PROCESSING SYSTEM

[75] Inventors: Toshio Hirosawa, Machida; Motohide Kokunishi, Kokubunji; Tutomu Itoh, Kanagawa-ken; Masaharu Iwanaga, Kamakura, all of Japan

[73] Assignee: Hitachi, Ltd., Tokyo, Japan

[21] Appl. No.: 942,811

[22] Filed: Sep. 10, 1992

Related U.S. Application Data

[63] Continuation-in-part of Ser. No. 848,930, Mar. 10, 1992, abandoned.

[30] Foreign Application Priority Data

| Mar. 14, 1991 | [JP] | Japan | 3-049344 |
| Sep. 13, 1991 | [JP] | Japan | 3-234553 |

[51] Int. Cl.$^6$ ............................................. G06T 1/00
[52] U.S. Cl. .............. 395/183.22; 395/347; 395/340; 395/344; 395/200.11; 345/117; 345/120; 340/384.1
[58] Field of Search ............... 395/153, 157, 395/158, 163, 200, 275, 183.22; 345/1, 4, 117, 119, 120, 168; 340/825.16, 825.17, 825.06, 815.01, 384 R; 379/1, 25, 26, 28, 247, 248, 164; 371/29.1, 67.1; 455/9; 364/188

[56] References Cited

U.S. PATENT DOCUMENTS

| 4,589,068 | 5/1986 | Heinen, Jr. ........................ | 364/300 |
| 4,713,758 | 12/1987 | DeKelaita et al. ................ | 364/200 |
| 4,720,782 | 1/1988 | Kovalcin .......................... | 364/188 |
| 4,833,592 | 5/1989 | Yamanaka ......................... | 364/138 |
| 4,954,818 | 9/1990 | Nakane et al. .................... | 340/721 |
| 4,961,070 | 10/1990 | Maher et al. ..................... | 340/721 |
| 5,047,977 | 9/1991 | Hill et al. ........................ | 364/900 |
| 5,049,873 | 9/1991 | Robins et al. .................... | 340/825.06 |
| 5,101,425 | 3/1992 | Darland et al. ................... | 379/34 |
| 5,121,475 | 6/1992 | Child et al. ...................... | 395/153 |
| 5,165,036 | 11/1992 | Miyata et al. .................... | 395/800 |
| 5,226,120 | 7/1993 | Brown et al. ..................... | 395/200 |
| 5,237,677 | 8/1993 | Hirosawa et al. ................. | 395/183.22 |

OTHER PUBLICATIONS

Myers, Brad A., "A taxonomy of Window Manager User Interfaces", *IEEE Computer Graphics and Applications*, v8, n5, 1988, pp. 65–84.

*Primary Examiner*—Joseph H. Feild
*Attorney, Agent, or Firm*—Antonelli, Terry, Stout & Kraus, LLP.

[57] ABSTRACT

A console apparatus for an information processing system having a plurality of information processing apparatuses, includes a memory for storing messages received from the plurality of information processing apparatuses at a plurality of storage areas provided in correspondence with the plurality of information processing apparatuses; a message analyzing unit for analyzing the received messages to detect, as the states of the plurality of information processing apparatuses, a reply request by the information processing apparatus to an operator and an error occurrence of the information processing apparatus; and a display unit having a shared display screen for displaying the messages stored in the memory on the shared display screen at areas corresponding to the storage areas and for displaying among the states detected by the message analyzing unit the state of at least one information processing apparatus on the shared display screen so as to allow a recognition of the state at a glance.

43 Claims, 12 Drawing Sheets

CONSOLE APPARATUS FOR INFORMATION PROCESSING SYSTEM

This application is a continuation-in-part of U.S. patent application Ser. No. 848,930 entitled CONSOLE EQUIPMENT FOR INFORMATION PROCESSING SYSTEM filed on Mar. 10, 1992 in the name of A. Ueoka et al now abandoned, the contents of which are incorporated herein by reference.

BACKGROUND OF THE INVENTION

1. Field of the Invention

The present invention relates to a console apparatus for an information processing system, and more particularly to a console apparatus for an information processing system capable of controlling a plurality of computer systems.

2. Description of the Related Art

As the range of applications to recent computer systems (information processing apparatuses) expands, a computer center with only one computer system is unable to meet user demands, and so a plurality of computer systems are installed at the center.

In such a case, console apparatuses numbering as many as the number of computer systems are installed. A control panel having lamps for indicating the operation state (such as error occurrence) of each computer is also provided and connected to the computer systems via private lines.

Installation of a plurality of console apparatuses forces an operator to patrol console apparatuses and periodically monitor the control panel, or requires an increase in the number of operators.

The former requirement leads to poor efficiency in operation management of computer systems and low reliability is also caused due to a possible check miss by an operator. The latter requirement is contradictory with labor saving systems.

Under such circumstances, a console apparatus capable of controlling a plurality of computer systems has been proposed, as described in Document (1) "Automatic Operation Support System by Personal Computer (V)—Console operation with Multi-window feature", Preprints of Lectures, pp.4–75, 76, the 42 (the first half year of 1991) National Conference of Information Processing Society of Japan.

According to Document (1) "Multiwindow-base Concentrated Console Function", a console function for a plurality of computer systems is realized by a single console apparatus by displaying a plurality of windows having the same number as that of the computer systems on the common screen of the console apparatus. An error display window is also given on this common screen to indicate a computer system which has any trouble.

Also disclosed in JP-A-1-96725 (Document (2)) is a console apparatus capable of controlling a plurality of computer systems of an information processing system, and displaying the operation state of each computer system on a window assigned to the computer system.

The console apparatus of a conventional information processing system disclosed in Document (2) displays both normal operation messages and abnormal operation or error messages as they occur, the error message being displayed in red. An operator is forced to always monitor the console apparatus so as not to overlook the display of a red error message.

It is necessary for an operator to respond quickly to a reply request message from a computer system, and to always monitor the status of all computer systems.

However, the "Multiwindow-base Concentrated Console Function" in Documents (1) and (2) does not disclose a means of responding to a reply request message. Although an identification of a computer system which has any trouble is indicated on the console screen, the status of other computer systems are not displayed.

Furthermore, in a conventional console apparatus, a window is not provided with an indication of to which computer system it belongs.

SUMMARY OF THE INVENTION

It is an object of the present invention to provide a console apparatus for an information processing system capable of eliminating the above-described disadvantages of the conventional techniques.

It is another object of the present invention to provide a console apparatus for an information system capable of controlling a plurality of computer systems, responding to a reply request message, and displaying the status of at least one computer system so as to facilitate recognition of it at a glance.

It is a further object of the present invention to provide a console apparatus for an information system capable of explicitly indicating for which computer system an entered command is valid.

It is a still further object of the present invention to provide a console apparatus for an information system capable of explicitly indicating to which computer system a window on the console screen corresponds.

According to an aspect of the present invention, there is provided a console apparatus for an information processing system having a plurality of information processing apparatuses, including a memory for storing messages received from the plurality of information processing apparatuses, a memory being disposed at a plurality of storage areas provided in correspondence with the plurality of information processing apparatuses; a message analyzing unit for analyzing the received messages to detect, as the status of the plurality of information processing apparatuses, a reply request by the information processing apparatus to an operator and an error occurrence of the information processing apparatus, and a display unit having a shared display screen for displaying the messages stored in the memory on the shared display screen at areas corresponding to the storage areas, and for displaying among the status detected by the message analyzing unit the status of at least one information processing apparatus on the shared display screen so as to allow a recognition of the status at a glance.

According to another aspect of the present invention, there is provided a console apparatus for an information processing system having a plurality of information processing apparatuses, including a first memory for storing messages received from the plurality of information processing apparatuses, the first memory being disposed at a plurality of storage areas provided in correspondence with the plurality of information processing apparatuses; a message analyzing unit for analyzing the received messages to detect, as the status of the plurality of information processing apparatuses, a reply request by the information processing apparatus to an operator and an error occurrence of the information processing apparatus, a second memory for storing the status of the plurality of information processing apparatuses detected by the message analyzing unit; and a display unit having a shared display screen for displaying the messages stored in the first memory on the shared display screen at areas corresponding to the storage areas and for displaying among the status stored in the second memory the status of at least one information processing apparatus on the shared display screen so as to allow a recognition of the status at a glance.

According to a further aspect of the present invention, there is provided a console apparatus for an information processing system having a plurality of information processing apparatuses, including a memory means for storing messages received from the plurality of information processing apparatuses, the memory being disposed at a plurality of storage areas provided in correspondence with the plurality of information processing apparatuses; a message analyzing unit for analyzing the received messages to detect, as the status of the plurality of information processing apparatuses, a reply request by the information processing apparatus to an operator and an error occurrence of the information processing apparatus; a display unit having a shared display screen for displaying the messages stored in the memory on the shared display screen at areas corresponding to the storage areas, and for displaying among the status detected by the message analyzing unit the state of at least one information processing apparatus on the shared display screen so as to allow a recognition of the state at a glance; a command input unit for inputting a command; a selecting unit for selecting the information processing apparatus to which the input command is destined; and a command storage unit for making the input command store in the memory at the storage area corresponding to the selected information processing apparatus, wherein the display unit displays the command stored in the memory and the message of the selected information apparatus stored in the memory, on the shared display screen at an area corresponding to the selected information processing apparatus.

According to a still further aspect of the present invention, there is provided a console apparatus for an information processing system having a plurality of information processing apparatuses, including a memory for storing messages received from the plurality of information processing apparatuses, the memory being disposed at a plurality of storage areas provided in correspondence with the plurality of information processing apparatuses, and a display unit having a shared display screen for displaying the messages stored in the memory on the shared display screen at areas corresponding to the storage areas and for displaying identification information of at least the information processing apparatus corresponding to the window as a foremost window on the shared display screen, on the shared display screen.

Preferably, the display unit displays the status of all the plurality of information processing apparatuses on the shared display screen so as to allow recognition of the status at a glance.

Preferably, the display unit displays the status of the plurality of information processing apparatuses on the shared display screen within a common window.

According to an example of the console apparatus of the present invention, a received message is analyzed by the message analyzing unit to detect a reply request. The display unit displays the operation status such as an error occurrence, reply request, operation status and the like of at least one computer system (information processing apparatus) on the shared display screen so as to provide a recognition of the status at a glance.

At this time, an operator can know at once that there is a computer system requesting an operator response. Furthermore, with a provision of a recognition of the status of all of the computer systems at a glance, the operator can monitor the status of all of the computer systems without directly overseeing them.

According to an example of the present invention, the display unit displays the received messages on the shared display screen within windows provided in correspondence with the plurality of computer systems, and displays the operation status such as an error occurrence, reply response, operating status and the like of all of the computer systems on the shared display screen so as to provide a recognition of the status at a glance.

According to an example of the present invention, the display unit positions the window corresponding to the computer system to which an input command is destined, as the foremost window on the screen. More preferably, the display unit displays identification information representing which computer system corresponds to the foremost window.

Since the window for the input command is displayed as the foremost window on the shared display screen, it is possible to avoid an operator manipulation error. Furthermore, since the identification information is displayed, it is possible to recognize for which computer system the input command is valid.

According to another example of the present invention, the display unit displays the identification information of at least the foremost window on the shared display screen, it is possible to readily recognize which computer system corresponds to the message and the like within the window, to thereby avoid erroneous manipulation.

DESCRIPTION OF THE PREFERRED EMBODIMENTS

An embodiment of a console apparatus for an information processing system according to the present invention will be described with reference to FIGS. 1 to 11.

Figure 1:
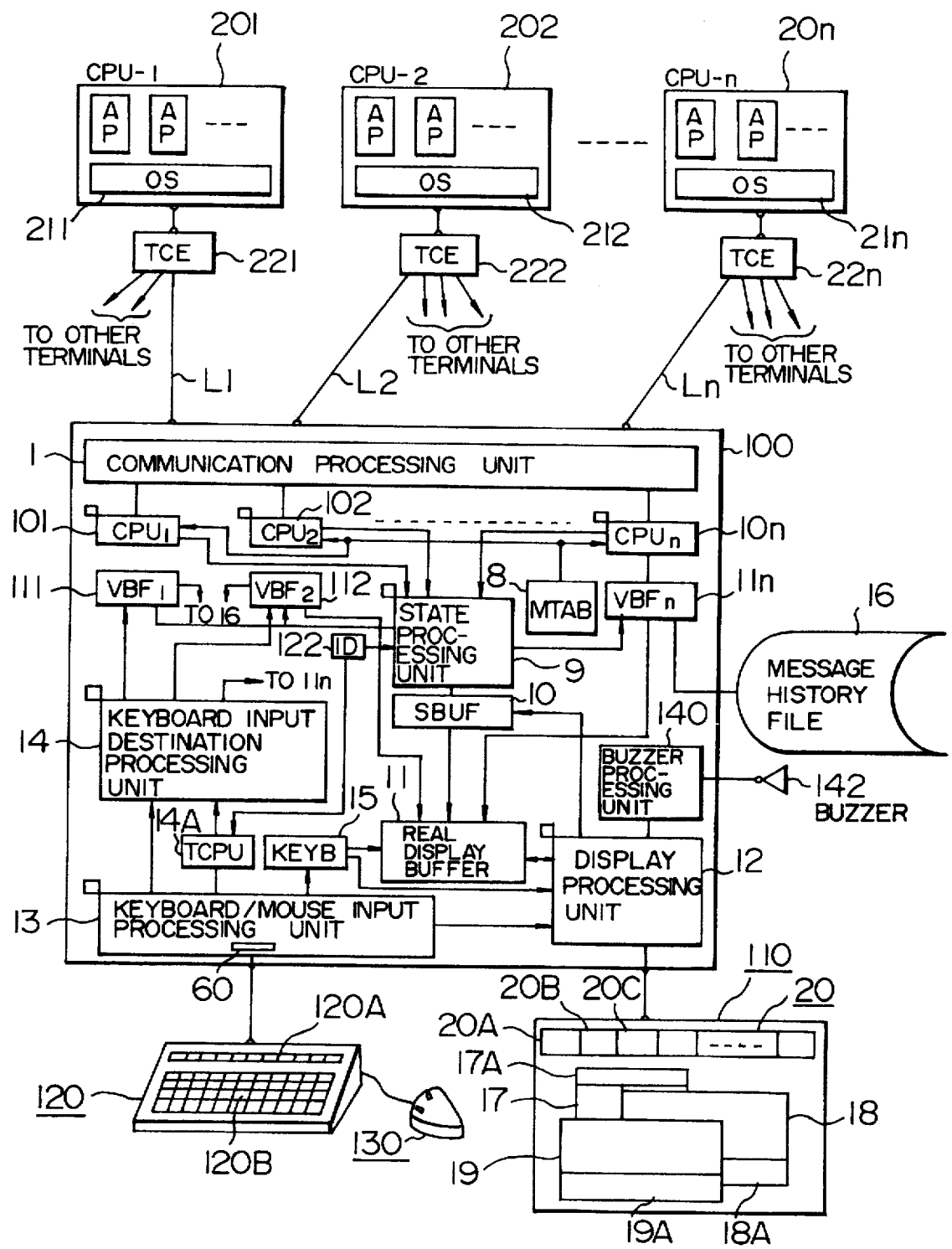
FIG. 1 is a block diagram of an information processing system having a console apparatus according to an embodiment of the present invention.

FIG. 1 is a block diagram showing the configuration of an information processing system having a console apparatus for an information processing system according to the present invention, which console apparatus can, by itself, perform collective management and control of the console function of an information processing system.

The information processing system shown in FIG. 1 has a plurality of computer systems (or information processing apparatuses), e.g., n (n is a positive integer) computer systems.

Operating systems (OSs) 211, 212, . . . , 21n run on the computer systems (information processing systems) 201, 202, . . . , 20n. Application programs (APs) run on these OSs 211, 212, . . . , 21n which may be the same OS or different OSs.

Each computer system 201, 202, . . . , 20n is connected via each corresponding terminal control equipment (TCE) 221, 222, . . . , 22n to a console apparatus controller 100. Each TCE is connectable to a plurality of terminal equipment. At least one signal line among a plurality of signal lines of each TCE is used for the connection to the console apparatus. These signal lines are represented by L1, L2, . . . , Ln in the example shown in FIG. 1.

Messages and commands are transferred to and from service processors (SVPs, not shown) of the computer systems 201, 202, . . . , 20n via the signal lines L1, L2, . . . , Ln.

With the conventional technique, a console apparatus to be provided independently for each computer system is connected to each of the signal lines L1, L2, . . . , Ln. According to this embodiment, however, a single console apparatus by itself performs collective management and control of the console function of the information processing system. The console apparatus is constructed of, e.g., the controller 100, a display unit 110, a keyboard 120, and a mouse 130. This single console apparatus is adapted to control a plurality of computer systems. The controller 100 is provided with a data processing capability, and may be realized by using a personal computer or work station. OS such as MS-DOS and UNIX (both registered trademarks) run on this controller 100, such OSs being omitted in FIG. 1. The controller 100 is connected not only to the display unit 110, but also to the input devices including the keyboard 120 and mouse 130.

In the controller 100, various processing units or program sets operate to perform collective management and control of the console function of the information processing system according to the present invention. Reference numeral 1 represents a communication processing unit which controls the transfer of messages and commands between the computer systems 201, 202, . . . , 20n and OSs 211, 212, . . . , 21n. The communication processing unit 1 has a function of controlling the data transfer to and from each of the signal lines L1, L2, . . . , Ln. For example, it has a function of a virtual telecommunication access method (VTAM) which is described in the following documents:

(1) IBM Systems Journal, Vol. 15, No. 1, pp. 4 to 80, 1976; and (2) IBM Systems Journal, Vol. 13, No. 2, pp. 140 to 162, 1974, "Synchronous data link control: A perspective".

Reference numerals 101, 102, . . . , 10n represent console processing units (CPUs) for respective computer systems 201, 202, . . . , 20n, for realizing the function of the console apparatus. The console processing unit 101 is provided for the computer system 201, the unit 102 for the system 202, . . . , and the unit 10n for the system 20n. The console processing units 101, 102, . . . , 10n are labeled in FIG. 1 $CPU_1$, $CPU_2$, . . . , $CPU_n$, respectively. The number of computer systems may be set as desired according to the present invention.

Each console processing unit 101, 102, . . . , 10n of the controller 100 can send a command for an initial program load (IPL) and commands for the hardware control to the service processor of each computer system 201, 202, . . . , 20n. Each console processing unit can receive a hardware error message from each service processor.

Reference numerals 111, 112, . . . , 11n represent virtual display buffers labeled in FIG. 1 $VBF_1$, $VBF_2$, . . . , $VBF_n$. for the respective $CPU_1$, $CPU_2$, . . . , $CPU_n$. Reference numeral 122 represents an identification (ID) table for storing identification information CPU-1, CPU-2, . . . , CPU-n of the computer systems 201, 202, . . . , 20n. Reference numeral 8 represents a message management table (MTAB) for storing error messages and reply request messages. Reference numeral 9 represents a state processing unit. Reference numeral 10 represents a state virtual display buffer (SBUF).

The state virtual display buffer 10 is divided into segmental areas (10A, 10B, . . . shown in FIG. 5) corresponding to the computer systems 201, 202, . . . , 20n. Reference numeral 11 represents a real display buffer. Reference numeral 12 represents a display processing unit for the control of the display unit 110. Reference numeral 13 represents keyboard/mouse input processing unit, and reference numeral 14 represents a keyboard input data destination processing unit.

Reference numeral 14A represents an identification information table (TCPU) for storing identification information for identifying a computer system regarding to which a command input via the keyboard/mouse input processing unit 13 is transferred, and reference numeral 15 represents a keyboard input buffer (KEYB).

Reference numeral 16 represents a history file for storing messages sent from the console processing units 101, 102, . . . , 10n while discriminating the messages among the console processing units.

Figure 2:
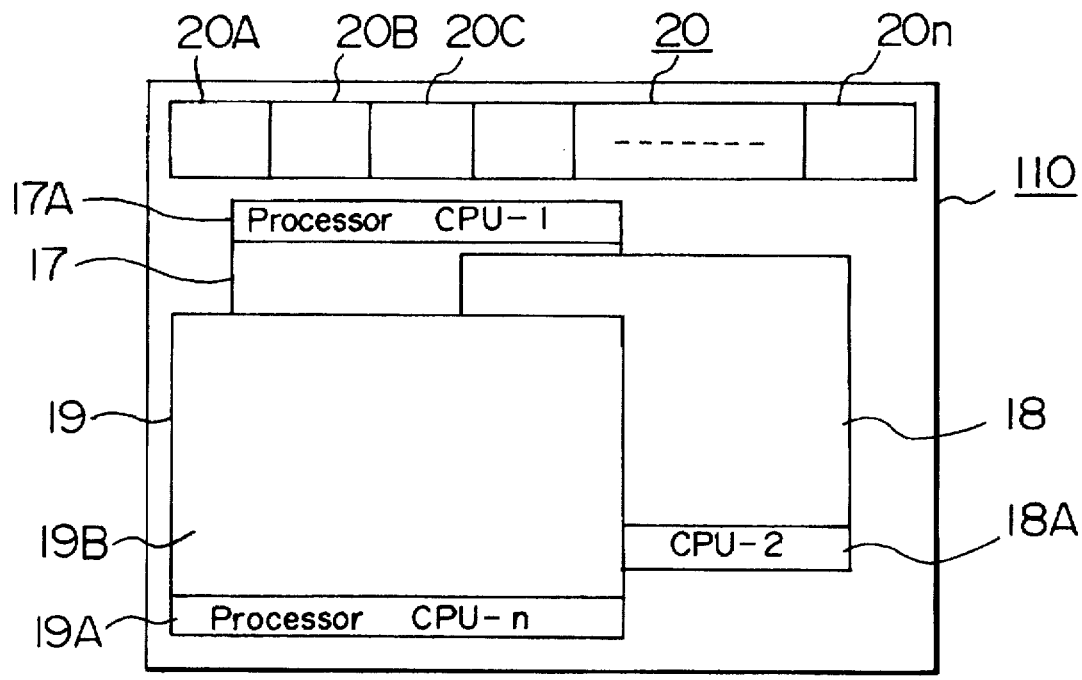
FIG. 2 is a diagram showing an example of displayed images on the screen of the console apparatus of the embodiment shown in FIG. 1.

FIG. 2 shows an example of images displayed on the screen of the display unit shown in FIG. 1.

Reference numerals 17, 18, 19, . . . represent windows. The window 17 is provided for the computer system 201, the window 18 for the computer system 202, . . . ,and the window 19 for the computer system 20n.

Reference numerals 17A, 18A, 19A, . . . represent identification display areas for displaying identification information representative of the correspondence between windows 17, 18, 19, . . . and the computer systems. It is possible to easily and correctly recognize, from the displayed identification information, which window belongs to which computer system.

Reference numeral 20 represents a state display window for displaying various status of the computer systems 201, 202, . . . , 20n. This window 20 is divided into segmental areas 20A, 20B, 20C, . . . , 20n corresponding to the computer systems 201, 202, . . . , 20n.

Figure 3:
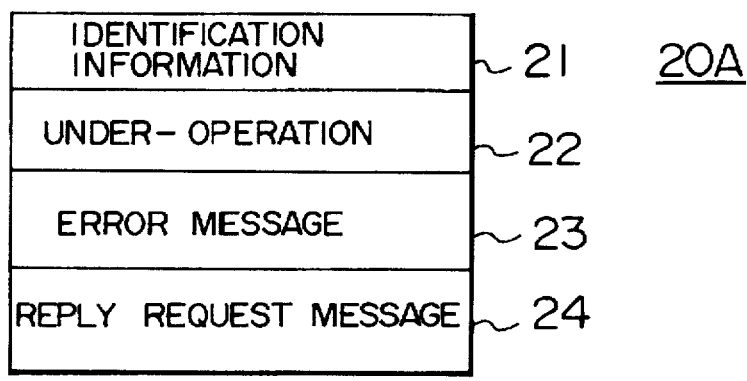
FIG. 3 is a diagram showing an example of segmented areas of the status display window shown in FIG. 2.

Of the segmental areas 20A, 20B, 20C, . . . , 20n, the segmental area 20A for example has four sub-areas as illustratively shown in FIG. 3, including an identification display sub-area 21, an under-operation display sub-area 22, an error display sub-area 23, and a reply request display sub-area 24.

Displayed on the identification display sub-area 21 within each segmental area is the identification information (e.g., CPU-1, . . . , CPU-n) of the computer system corresponding to the segmental area. Displayed on the under-operation display sub-area 22 for the computer system with no error occurrence and no reply request issuance, is the operation status information of "Under-operation". If the computer system is at a stop, an indication "Stop" may be displayed on the under-operation display sub-area 22, or alternatively no indication is displayed. Displayed on the error display sub-area 23 for the computer system with an error occurring threat, is the operation state information of "Error". Displayed on the reply request display sub-area 24 for the computer system requesting an operator response, is the operation status information of "Reply request". The sub-areas displaying "Error" and "Reply request" are preferably indicated in a different color from that of the other sub-areas. If there is a sub-area displaying "Error" or "Reply request", a buzzer for example provided at the controller 100 is activated to generate an alarm sound, as will be described later.

The states of all of the computer systems 201, 202, . . . , 20n can be recognized at a glance from the state display window 20, and an alarm sound from the buzzer can help an operator take necessary action.

Figure 4:
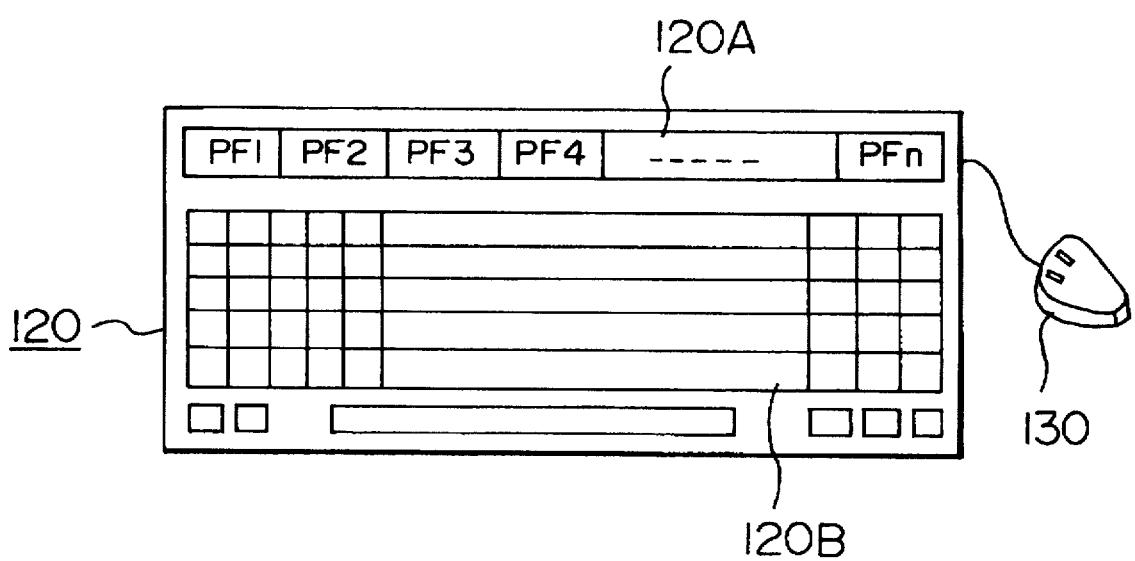
FIG. 4 shows a layout of keys on the keyboard shown in FIG. 1.

FIG. 4 shows an example of the layout of keys of the keyboard 120.

Reference numeral 120A represents a special key group (program function keys P·F keys), and reference numeral 120B represents a general key group.

Special keys PF1, PF2, . . . , PFn of the special key group 120A are assigned to the computer systems 201, 202, . . . , 20n.

The functions of the above-described processing units 1, 101 to 10n, 9, 12 to 14 may be implemented by hardwares or by using a microprocessor and programs. In the latter case, each of these units each has the program for performing the function thereof and these programs are operated by the microprocessor.

Next, the operation of the console apparatus of the embodiment will be described with reference to FIGS. 1 and 5.

Figure 5:
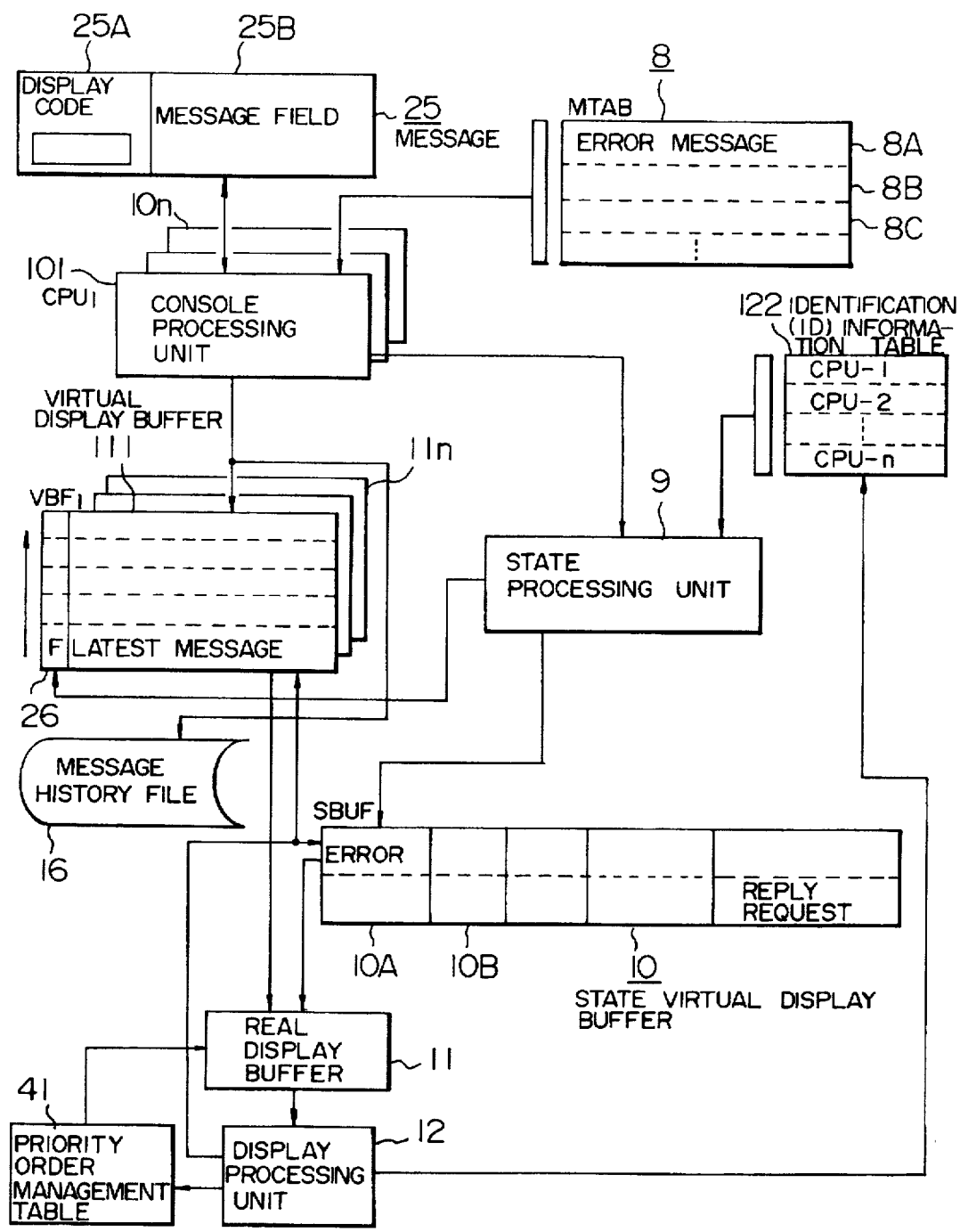
FIG. 5 shows the configuration of main parts of the console apparatus, for explaining the operation of the console apparatus shown in FIG. 1.

As shown in FIG. 5, when the communication processing unit 1 receives a message 25 from one of the computer systems, the control is passed to the corresponding one of the console processing units 101, 102, . . . , 10n. In the following, the control at the console processing unit 101 for the computer system 201 for example will be described.

The console processing unit 101 stores the received message in the associated virtual display buffer 111, and in the message history file 16 as the history of messages.

The console processing unit 101 checks whether the message 25 is an error message indicating an error occurrence, a reply request message requesting an operator response, or another message.

The message 25 is judged to be an error message for example, from one of the following judgment criteria:

(1) A display code field 25A of the message 25 contains a turned-on or set error flag.

(2) A message field 25B of the message 25 has the same contents as an error message stored in the message management table 8.

(3) A special character or symbol representing an error occurrence exists at a particular position of the message field 25B of the message 25. For example, the message 25 contains a symbol "@" at the start thereof.

The message 25 is judged to be the reply request message for example, from one of the following criteria:

(1) The display code field 25A of the message 25 contains a turned-on or set reply request flag.

(2) The message field 25B of the message 25 has the same contents as a reply request message stored in the message management table 8.

(3) A special character or symbol representing a reply request exists at a particular position of the message field 25B of the message 25. For example, the message 25 contains a symbol "*" at the start of it.

If one of the above criteria is satisfied, it is judged that the received message 25 is the error message or reply request message, and control is passed to the state processing unit 9. In the following description, it is assumed that the received message 25 is an error message, and control is passed to the state processing unit 9.

The error flag in a message is turned on by a service processor or OS of a computer system when it detects an error. On the other hand, error messages in the table MTAB 8 are those entered in advance by an operator using the input device such as the keyboard. Judgment of an error message may be made by using only the error flag without using the table 8.

The state processing unit 9 stores the state information of "Error" or "Reply request" in one of segmental areas 10A, 10B, . . . , 10n of the state virtual display buffer 10 corresponding to one of the computer systems 201, 202, . . . , 20n from which the message was sent. For example, the state information of "Error" is stored in the segmental area 10A of the state virtual display buffer 10 corresponding to the computer system 201.

The state processing unit 9 also turns on an error bit or reply request bit of a flag in one of the virtual display buffers 111, 112, . . . , 11n corresponding to one of the computer systems 201, 202, . . . , 20n from which the message 25 was sent. For example, the error bit of the flag 26 is turned on in the virtual display buffer 111 corresponding to the computer system 201 from which the message 25 was sent. The state processing unit 9 reads from an identification (ID) table 122 the identification information of the computer system having issued the message, adds the identification information to the state information of the message to store them in the state virtual display buffer 10.

In the above manner, messages from the computer systems 201 to 20n are stored in the corresponding virtual display buffers 111 to 11n (VBF$_1$ to VBF$_n$), and the state information of the messages together with the identification information is stored in the state virtual display buffer SBUF 10. Next, the display processing unit 12 shown in FIG. 1 operates so as to transfer the contents of the virtual display buffers 111 to 11n (VBF$_1$ to VBF$_n$) and state virtual display buffer SBUF 10 to the real display buffer 11 in accordance with a multiwindow display procedure. The display processing unit 12 is always operating.

Specifically, this unit 12 reads the messages from the virtual display buffers 111 to 11n and transfers them to the real display buffer 11, and also reads the state information and identification information from the state virtual display buffer 10 and transfers them to the real display buffer 11. The display processing unit 12 may read the identification information directly from the ID table 122. The display processing unit 12 operates to display the contents of the real display buffer 11 on the screen of the display unit 110, while referring to a priority table 41 and window management tables 42-1, . . . , 42-n and 44 to be described later.

Messages and the like are therefore displayed on the screen of the display unit 110 within the windows 17, 18, 19, . . . and state display window 20, as illustratively shown in FIGS. 2 and 3. The window mapping procedure by the display processing unit 12 from the virtual display buffers VBF$_1$ to VBF$_n$ to the real display buffer 11 may be conducted following the technique disclosed in U.S. Pat. No. 4,550,386, JP-A-60-135989 and JP-A-62-6377 of the same assignee of the present application.

Figure 6:
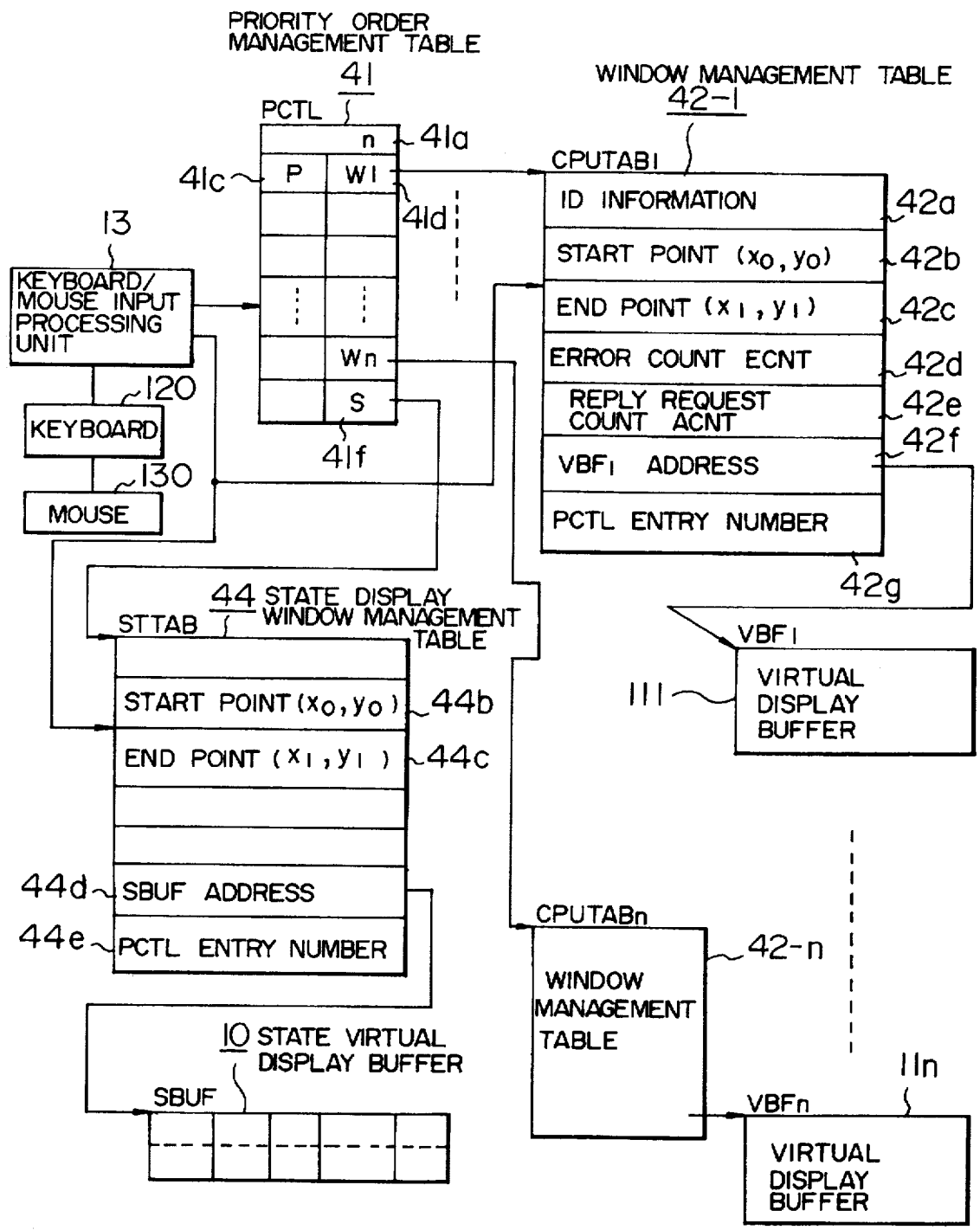
FIG. 6 shows control tables used by the console apparatus, for explaining the operation of the console apparatus shown in FIG. 1.

FIG. 6 shows the relationship between control tables to be used for the display control. These control tables are provided within the controller 100. The priority management table (PCTL) 41 stores the display priority order of the windows 17, 18, 19, . . . and state display window 20, the display priority order meaning the order of windows to be displayed on the screen starting from the foremost window on the screen and following windows sequentially displayed in the background.

The priority management table PCTL 41 stores the number 41a of entries (corresponding to the number n of computer systems), the priority order 41c of the windows, the addresses 41d (e.g., W1, . . . , Wn) of the window management tables 42-1, . . . , 42-n for the windows 17, 18, 19, . . . , and the address 41f (e.g., S1) of the state display window management table 44 for the state display window 20. The priority order of these windows is entered, for example, from the mouse 130 via the keyboard 120 and keyboard/mouth input processing unit 13.

Each window management table CPUTAB 42-2 to 42-n has the same structure. For example, the window management table CPUTAB1 42-1 has a field 42a for storing the identification information of the computer system 201, and stores start and end point coordinates 42b and 42c of the window for the computer system 201, an error count 42d, a reply request count 42e, the address 42f of the associated virtual display buffer 111, and the entry number 42g of the priority management table 41.

As will be detailed later, the error count ECNT 42d and reply request count ACNT 42e are incremented by 1, for example, each time an error message or reply request message is detected in the message from the corresponding computer system, and decremented by 1, for example each time an operator has dealt with the received message.

The start and end point coordinates of each window are entered, for example, from the mouse 130 via the keyboard 120 and keyboard/mouth input processing unit 13.

The state display window management table 44 stores the start and end point coordinates 44b and 44c of the state display window 20, the address 44d of the state virtual display buffer 10, and the entry number of the priority management table 41, as well as the start and end point coordinate set of the segmental areas 20A to 20N of the state display window 20.

In order to display the state display window 20 so as not to be covered by the other windows 17, 18, 19, . . . , the priority order of the window 20 is set to the most preferential order in the priority order management table 20 (in this case, the state display window 20 is displayed as the foremost window on the screen), or the start and end point coordinates 44b and 44c of the state display window management table 44 are set to values which allow the state display window 20 not to be covered by the other windows 17, 18, 19, . . .

In displaying the contents of the real display buffer 11, the display processing unit 12 refers to the priority orders stored in the table 41, the coordinates of the windows stored in the tables 44, 42-1 to 42-n.

Next, a command input operation will be described.

When a message "Reply request" is displayed on the state display window 20, it is necessary to send a command to the computer system which issued the reply request message.

If a command is to be sent to a computer system, an operator is required to select the computer system. This selection may be made by one of the following three schemes:

(1) One of the windows 17, 18, 19, . . . , displayed on the screen corresponding to the subject computer system is pointed by using a pointing device such as the mouse 130.

(2) One of the segmental areas 20A, 20B, . . . , 20n of the state display window 20 displayed on the screen corresponding to the subject computer system is pointed by using a pointing device such as the mouse 130.

(3) One of the special keys 120A on the keyboard 120 corresponding to the subject computer system is keyed in.

When an operator selects the subject computer system to which a command is sent, using one of the three schemes, the display processing unit 12 renews the contents of the VBF for the window stored in the real display buffer 11 so that the window is displayed as a foremost window on the screen. The identification information of the subject computer system is read from the ID table 122 and stored in the identification information table TCPU 14A. In addition, the priority order of the subject computer system is updated to the most preferential order in the priority management table 41.

Next, the operator enters a command from the keyboard 120.

The keyboard/mouse input processing unit 13 stores the command entered from the keyboard 120 in the keyboard input buffer 15.

The display processing unit 12 displays the command stored in the keyboard input buffer 15 on the window for the object computer system, this window being displayed as a foremost window on the screen. In this manner, the input command is displayed on the foremost window on the screen.

The keyboard input destination processing unit 14 stores the command entered from the keyboard 120 in the virtual display buffer VBF for the computer system identified by the identification information stored in the identification information table 14A.

The command stored in the virtual display buffer is transmitted to the subject computer system, by means of one of the console processing units 101, . . . , 10n and communication processing unit 1.

Figure 7:
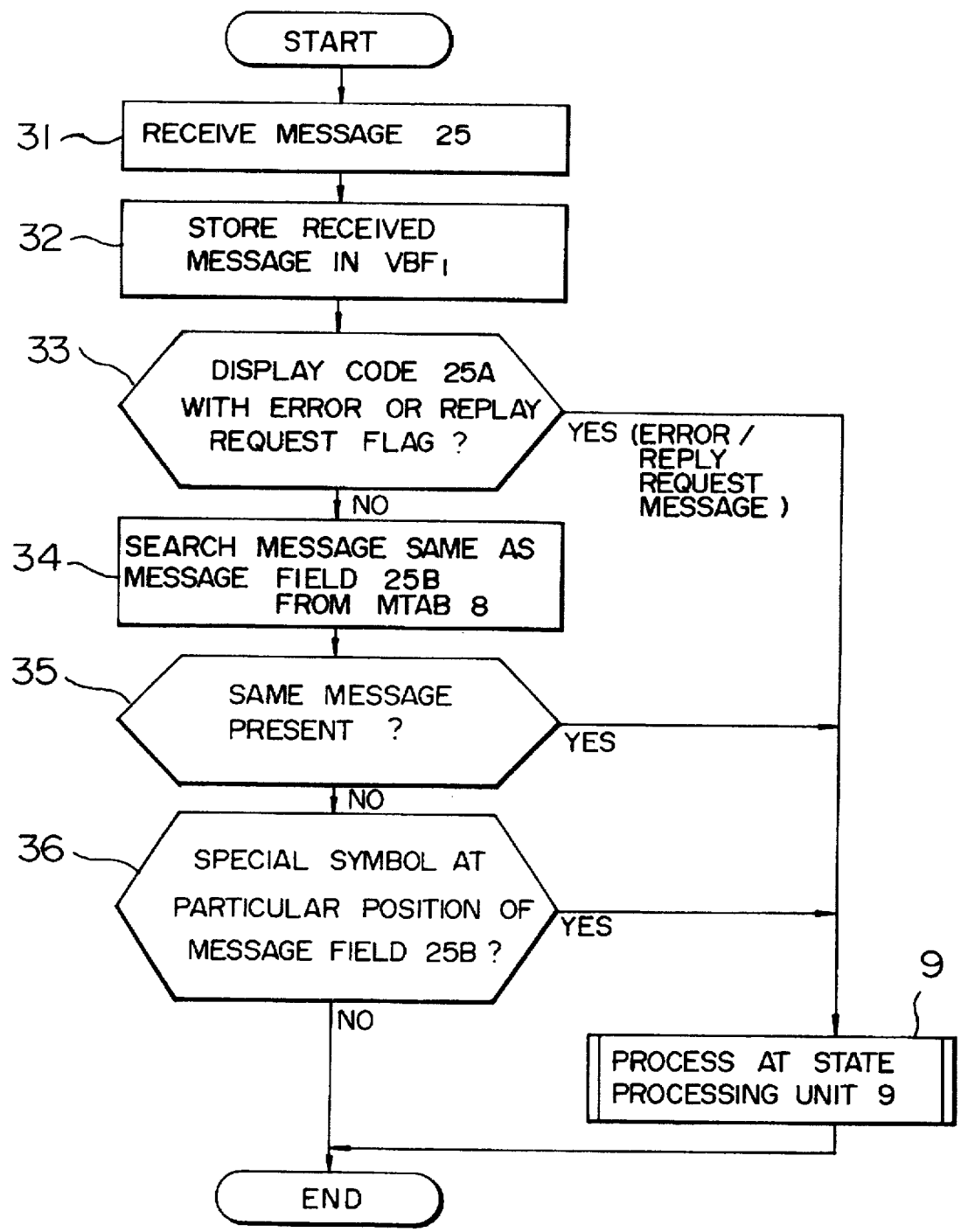
FIG. 7 is a flow chart explaining the operations of detecting an error message or a reply request message by the console processing unit shown in FIG. 1.
Figure 8:
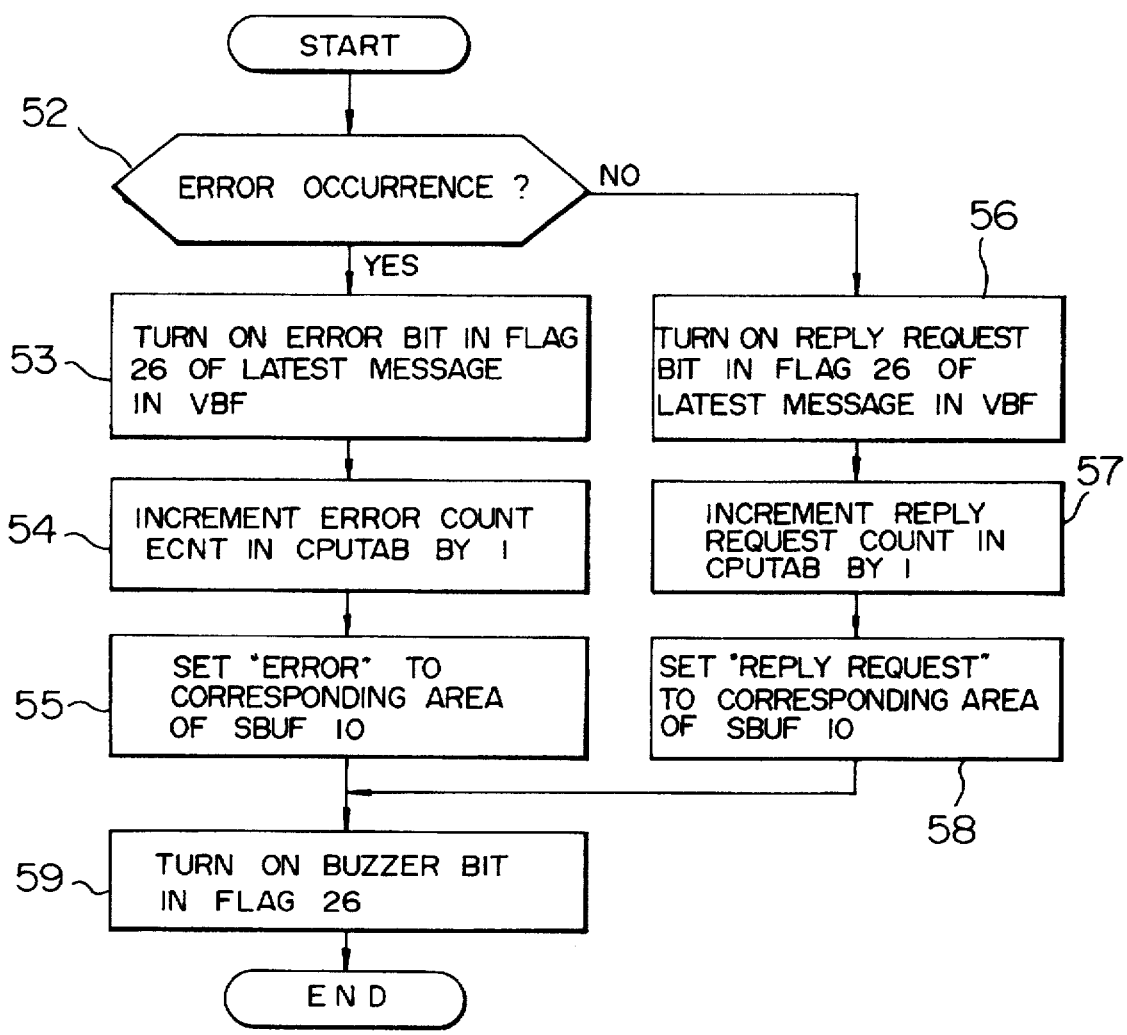
FIG. 8 is a flow chart explaining the operation of the status processing unit shown in FIG. 1.

Next, referring to FIG. 7, the operation of each console processing unit 101 to 10n in detecting an error message or a reply request message will be described in detail. In the following, the operation of the console processing unit 101 for example will be described, the operation of the other console units 102 to 10n being the same as that of the console processing unit 101.

At step 31, the console processing unit 101 receives a message 25 from the communication processing unit 1.

At step 32, the received message 25 is stored in the virtual display buffer 111 (VBF$_1$).

At step 33, the display code field 25A of the message 25 is checked to determine whether the error flag is on, the reply request flag is on, or neither flag is on. If the error flag or reply request flag is on, the control is passed to the state processing unit 9. If both the flags are not on, the control advances to step 34.

At step 34, the message management table 8 is searched to check whether the same message as the message 25 in the message field 25B is being stored in the table 8.

At step 35, if the same message as the message 25 in the message field 25B is being stored in the message management table 8, control is passed to the state processing unit 9. If not, control advances to step 36.

At the step 36, the message field 25B is checked to determine whether a special symbol (e.g., a symbol "@" representing an error occurrence or a symbol "*" representing a reply request) exists at a particular position (e.g., the top of the message). If one of these special symbols exists at the particular position, control is passed to the state processing unit 9. If none of these symbols exists at the particular position, the process is terminated. When control is passed to the state processing unit 9 from each of the steps 33, 35, and 36, a code representing the type of message is sent to the state processing unit 9 as a control parameter.

Figure 9:
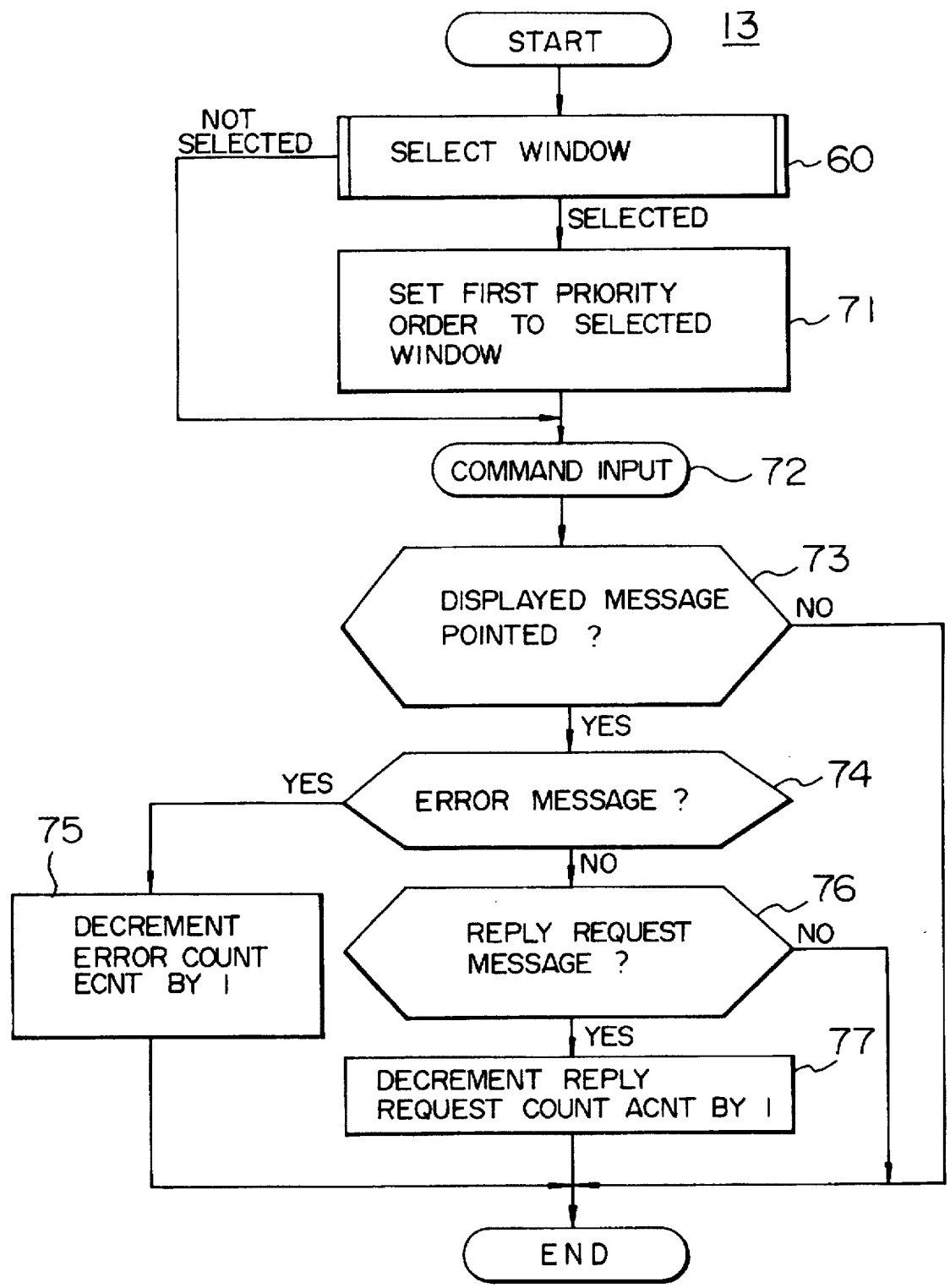
FIG. 9 is a flow chart explaining the operation of the keyboard/mouse input processing unit shown in FIG. 1.

Next, the operation of the state processing unit 9 will be described in detail with reference to FIG. 9.

At step 52, the state processing unit 9 judges, from the code representing the type of message received from the console processing unit 101, which of the error message and the reply request message was detected. If it is judged that the error message was detected, control advances to step 53. If it is judged that the reply request message was detected, control advances to step 56. The state processing unit 9 may judge by itself the type of a message without receiving the code representing the type of message from the console processing unit.

Turned on (set) at step 53 is the error bit of the flag 26 (FIG. 5) for the latest message stored in the virtual display buffer corresponding to the computer system from which the error message was sent.

Incremented by a certain count, e.g., 1 count at step 54 is the value of the error count 42d (FIG. 6) stored in the window management table for the computer system from which the error message was sent.

At step 55, the state information of "Error" is set to an area of the state virtual display buffer 10 for the computer system from which the error message was sent. Preferably, the display color is changed and a flushing display is instructed.

On the other hand, turned on (set) at step 56 is the reply request bit of the flag 26 (FIG. 5) for the latest message stored in the virtual display buffer corresponding to the computer system from which the reply request message was sent.

Incremented by a certain count, e.g. 1 count at step 57 is the value of the reply request count 42e (FIG. 6) stored in the window management table for the computer system from which the reply request message was sent.

At step 58, the state information of "Reply request" is set to an area of the state virtual display buffer 10 for the computer system from which the reply request message was sent. Preferably, the display color is changed and a flushing display is instructed.

Turned on (set) at step 59 is the buzzer bit of the flag 26 (FIG. 5) for the latest message stored in the virtual display buffer corresponding to the computer system from which the error message or reply request message was sent.

Figure 11:
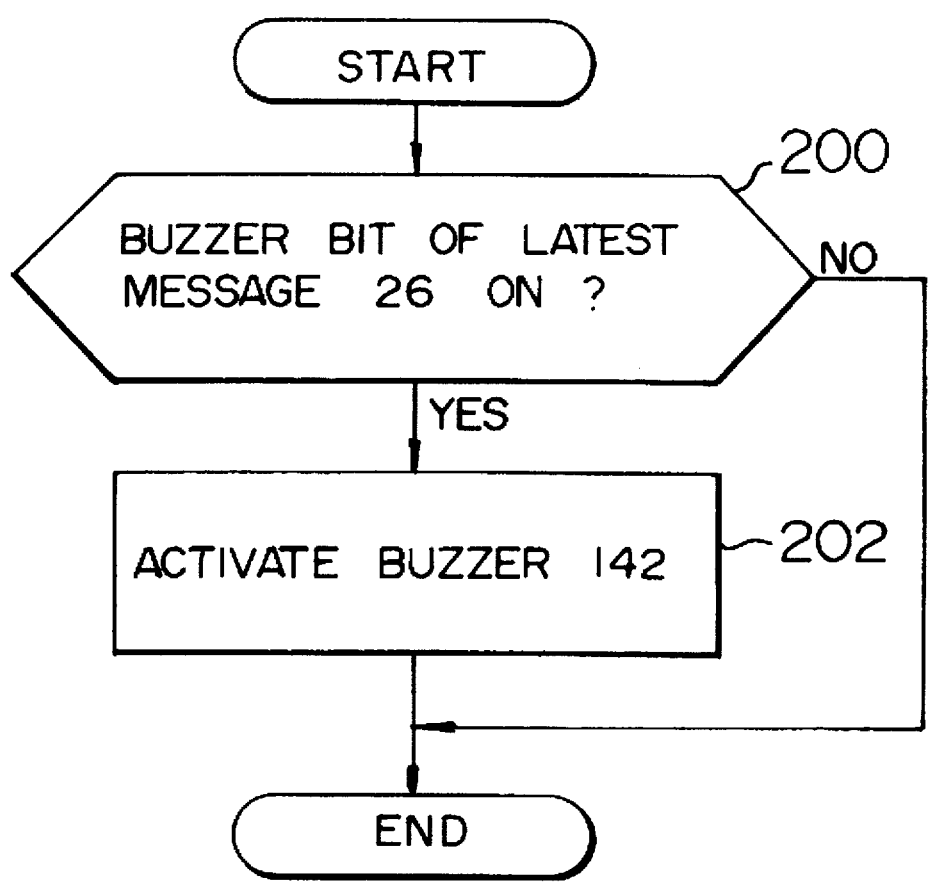
FIG. 11 is a flow chart explaining the operation of the buzzer processing unit shown in FIG. 1.

Next, the operation of activating the buzzer 142 will be described with reference to FIG. 11. In displaying the windows for the computer systems, the display processing unit 12 checks at step 200 whether there is a turned-on buzzer bit in any one of the virtual display buffers $VBF_1$ to $VBF_n$. If there is no turned-on buzzer bit, the buzzer is not activated. If there is a turned-on buzzer bit, the display processing unit 12 instructs the buzzer processing unit 140 to activate the buzzer for a predetermined period, e.g., 3 seconds at step 202.

Next, the operation of the keyboard/mouse input processing unit 13 will be detailed with reference to FIGS. 9 and 10.

At step 60, the control is passed to a window selection processing unit 60 within the keyboard/mouse input processing unit 13.

Figure 10:
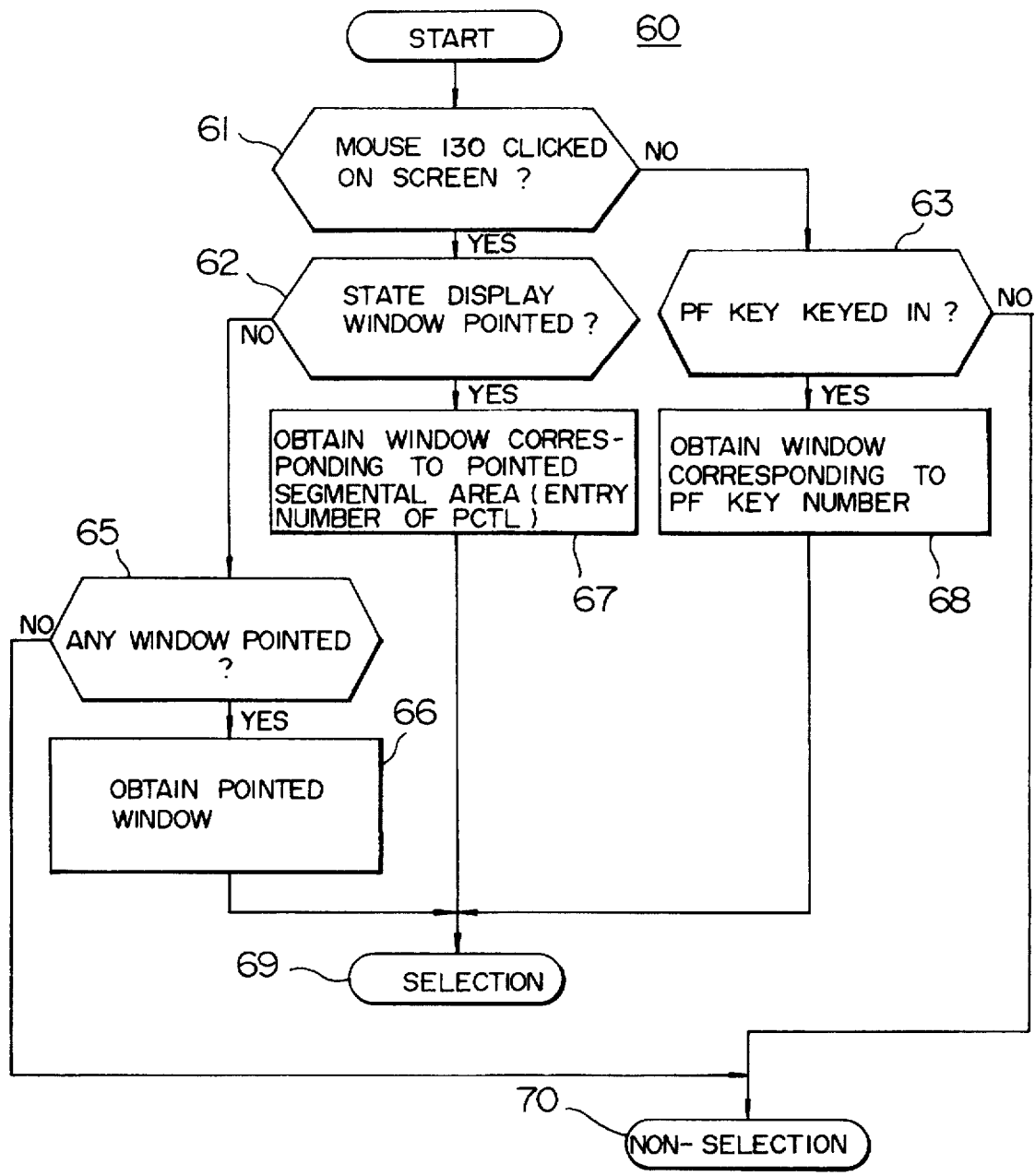
FIG. 10 is a flow chart explaining the operation of the window selection processing unit shown in FIG. 1.

As shown in FIG. 10, in the window selection processing unit 60, it is first checked at steps 61 to 63 whether the schemes (1) to (3) for selecting a computer system described previously were performed.

Steps 65 and 66 illustrate a process of pointing a window for a particular computer system with the mouse 130.

Step 67 illustrates a process of pointing a segmental area in the state display window 20 for a particular computer with the mouse 130.

Step 68 illustrates a process of keying in one of the special keys 120A.

If it is judged that a window was pointed at step 62 or step 65 or a PF key was keyed in at the step 63, then the entry number of the pointed window stored in the priority management table 41 is located or established. Namely, obtained is a pointed window, a window corresponding to the pointed segmental area, or a window corresponding the keyed-in PF key number (steps 66, 67, 68). The procedure then returns having a selected window (selection return) (step 69).

On the other hand, if it is judged that no window was pointed at the steps 62 and 65 or that no RF key was keyed in at the step 63, then the entry number within the table 41 cannot be located. Namely, the window selection conditions are not satisfied, and the procedure terminates as a non-selection return (step 70).

A window pointed at the step 65 is identified by the processing unit 60 with reference to the start and end point coordinates of the windows stored in the window management tables 42-2 to 42-n.

A window pointed at the step 62 is identified by the processing unit 60 with reference to the start and end point coordinates of the segmental areas 20A, 20B,..., 20N of the state display window 20 stored in the state display window management table 44.

Returning back to FIG. 9, the keyboard/mouse input processing unit 13 gives a most preferential order to the selected window so as to display this window as the top of windows on the screen. Specifically, the priority value 41c (FIG. 6) of the entry within the priority order management table located by the window selection processing unit 60, is given the largest number for example. The identification information of the computer system to which a command is to be sent is read from the ID table 122 and set to the identification information table 14A.

At step 72, when a command is input from the keyboard 120, this command is stored in the keyboard input buffer 15 and in the corresponding virtual display buffer 111 via the keyboard input destination processing unit 14.

The command stored in the keyboard input buffer 15 is transferred to the real display buffer 11. The command stored in the virtual display buffer 111 is transmitted via the communication processing unit 1 to the corresponding computer system.

At step 73 it is checked whether an operator points the message or state information displayed within the state display window 20. This message pointing is performed, for example, by the mouse. Then, the keyboard/mouse input processing unit 13 refers to the start and end point coordinates of the segmental areas 20A to 20N stored in the state display management table 44, and identifies the segmental area within which the message (error message, or reply request message) is being displayed. If no message is pointed, the procedure terminates. If anyone of the messages is pointed, the control advances to step 74.

In this manner, after an operator recovers an error in response to the error message, or after an operator responds to the computer system in response to the reply request message, the operator points the associated message within the state display window 20.

Specifically, at steps 74 and 75, when an error message is pointed, the error count 42d in the associated window management table is decremented by 1 for example.

At steps 76 and 77, when a reply request message is pointed, the reply request count 42e in the associated window management table is decremented by 1 for example.

When a message other than the error and reply request messages is pointed, the procedure terminates without performing any process.

The display processing unit 12 continues to display the error or reply request message within the segmental areas of the state display window, until the values of the error counts 42d or reply request counts 42e of the window management tables 42-1 to 42-n become 0.

Namely, for each computer system, when all reply requests have been responded to or all errors for error messages have been recovered, its count 42e or 42d becomes 0, and the display of "Reply request" or "Error" within the segmental area of the corresponding state display window 20 disappears.

Figure 12A:
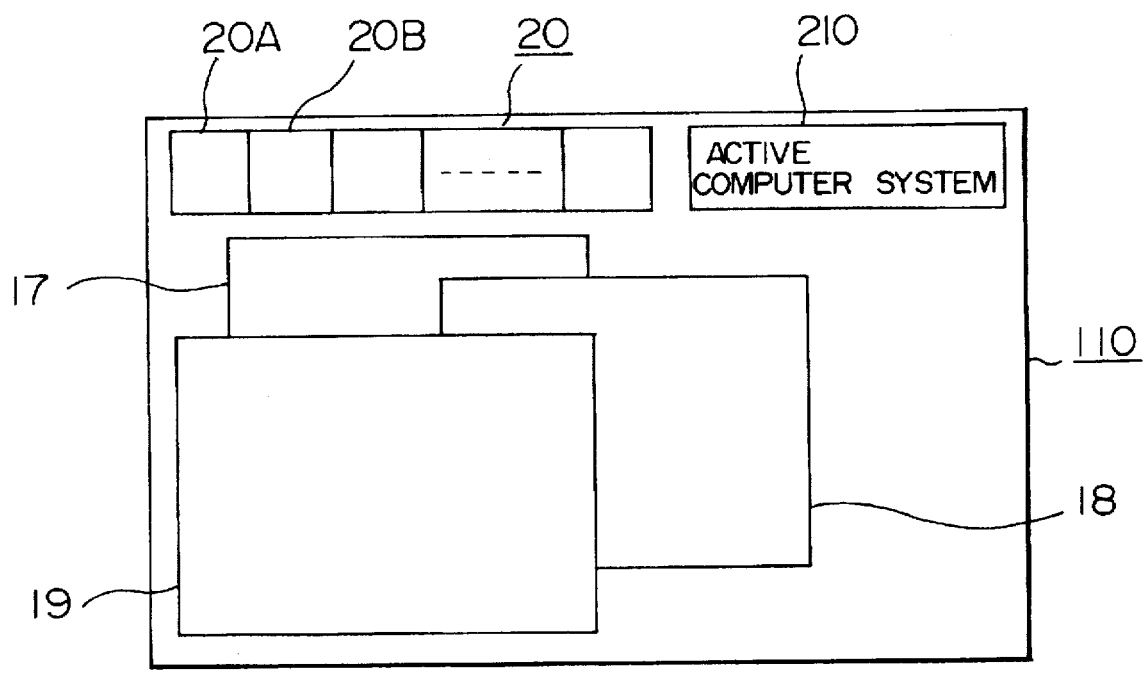
FIGS. 12A and 12B are diagrams showing examples of displayed images on the screens of console apparatuses according to other embodiments of the present invention.

FIG. 12A shows an example of images displayed on the screen of a display unit according to another embodiment of the present invention.

In this embodiment, the identification information of a window at the top of windows on the screen is displayed on an active computer system display window 210. The identification information is not displayed therefore within the foremost window on the screen.

Figure 12B:
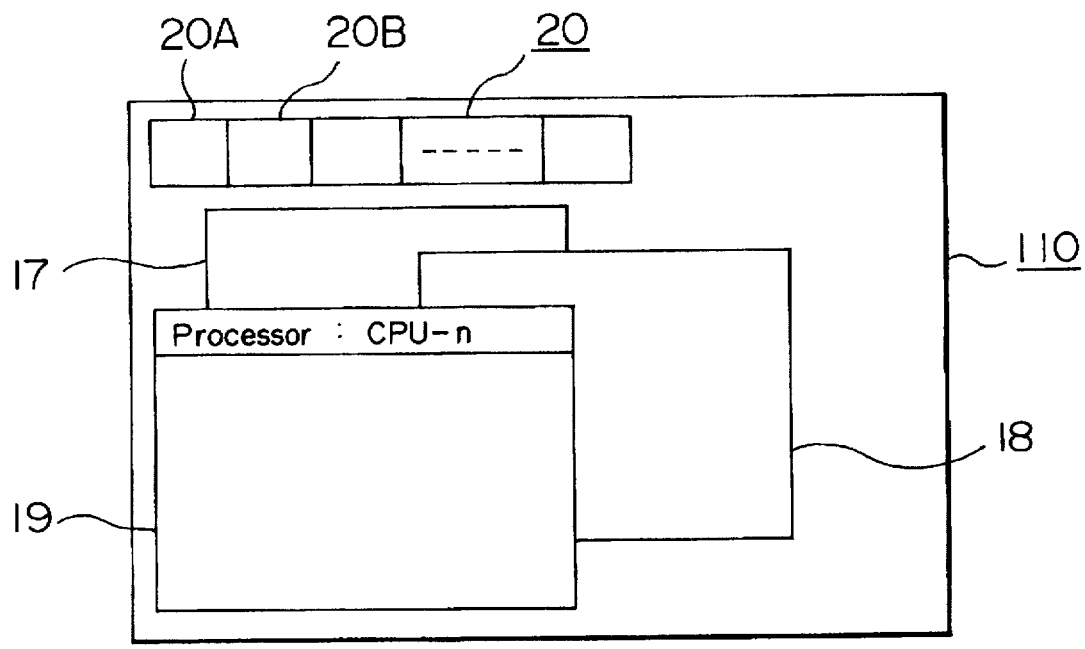

FIG. 12B shows an example of images displayed on the screen of a display unit according to a further embodiment of the present invention, wherein the identification information is displayed only for the foremost window.

Figure 13:
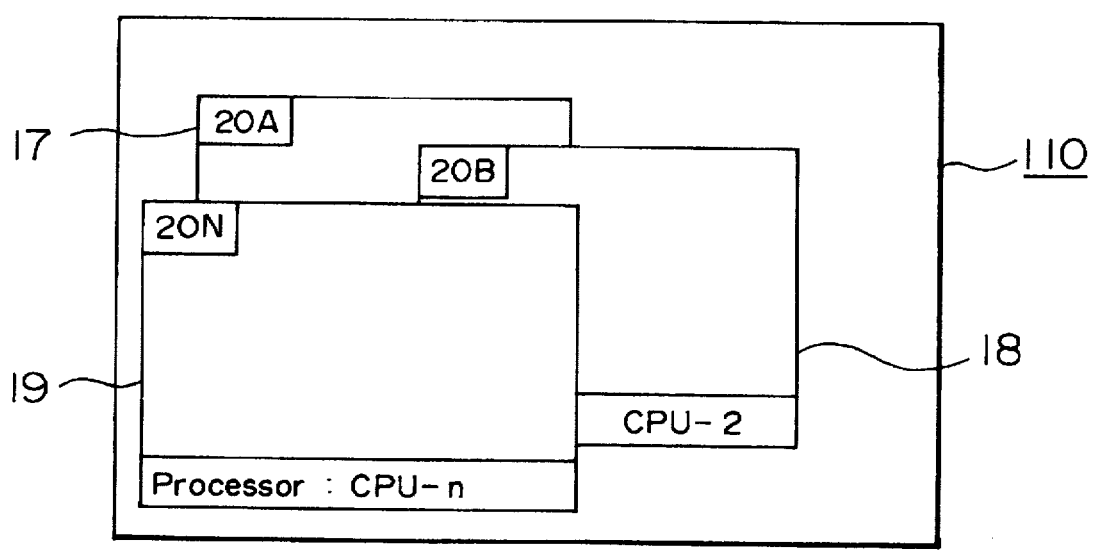
FIG. 13 is a diagram showing an example of displayed images on the screen of a console apparatus according to another embodiment of the present invention.

FIG. 13 shows an example of images displayed on the screen according to a still further embodiment, wherein the state display window 20 is not provided, but the indications such as the error message, reply request message, and under-operation message are displayed within each window 17, 18, . . . , 19.

According to the console apparatus of the present invention, a single console apparatus can control a plurality of computer systems. The operation state such as error, reply request, under-operation or the like for all computer systems can be displayed so as to recognize them at a glance, preventing an operator from overlooking the states of computer systems.

Furthermore, a command entered by an operator is supplied to the computer system whose window is displayed as the top of windows on the screen. Therefore, which computer system is valid for an entered command can be visually recognized from the screen, preventing erroneous manipulations. Still further, the identification information of at least the computer system having the foremost displayed window is displayed on the screen, providing an easy recognition of the correspondence between windows and computer systems.

In the above embodiment, an error message for a computer system may be a message which can discriminate between the types of error (e.g., error of software (OS or AP) or error of hardware). In this case, the types of errors are analyzed by the console processing unit and displayed for example on the state display window 20 on the screen.

Furthermore, instead of activating a buzzer when there occurs an error or reply request, a lamp may be illuminated. In this case, in place of the buzzer processing unit 140 and buzzer 142 shown in FIG. 1, a lamp processing unit and a lamp are provided.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A console apparatus for an information processing system having a plurality of information processing apparatuses, comprising:

memory means, having a plurality of storage areas assigned to respective ones of said plurality of processing apparatuses for storing messages received from said respective ones of said plurality of information processing apparatuses in one of said storage areas assigned thereto;

message analyzing means for analyzing said received messages to detect, as special states of said plurality of information processing apparatuses, a reply request issued from said information processing apparatuses to an operator of said information processing system and an error occurrence of said information processing apparatuses; and display means, including a display screen having therein a state window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of said information processing apparatuses to said state window.

2. A console apparatus for an information processing system according to claim 1, wherein said display means displays the state of all said plurality of information processing apparatuses on said display screen so as to enable recognition of said states at a glance at said display means.

3. A console apparatus for an information processing system according to claim 1, wherein said display means includes means for displaying the state of said plurality of information processing apparatuses on said display screen within said status window.

4. A console apparatus for an information processing system according to claim 1, wherein said display means includes means for displaying said reply request and said error occurrence detected by said message analyzing means as the special states of said plurality of information processing apparatuses.

5. A console apparatus for an information processing system according to claim 4, wherein said message analyzing means includes means for judging, as the states of said plurality of information processing apparatuses, the operating status of said information processing apparatuses, and said display means includes means for displaying the operating state of said information processing apparatuses as the special states of said information processing apparatuses, in accordance with the judgment result by said message analyzing means.

6. A console apparatus for an information processing system according to claim 1, further comprising means for turning on a lamp when said message analyzing means detects one of said reply request and said error occurrence from any one of said plurality of information processing apparatuses.

7. A console apparatus for an information processing system according to claim 1, further comprising means for activating a buzzer when said message analyzing means detects one of said reply request and said error occurrence from any one of said plurality of information processing apparatuses.

8. A console apparatus for an information processing system according to claim 1, wherein said message analyzing means includes means for discriminating said detected error occurrence of said information processing apparatus between a software error and a hardware error and for displaying a result of the discriminating by said means for discriminating denoting the software error or the hardware error.

9. A console apparatus for an information processing system according to claim 1, wherein said message analyzing means includes means for establishing said error occurrence of said information processing apparatuses when said received message from one of said information processing apparatuses includes an error flag.

10. A console apparatus for an information processing system according to claim 1, wherein said message analyzing means includes means for establishing said error occurrence of said information processing apparatuses when said received message from one of said information processing apparatuses is identical to an error message stored in advance upon comparison thereof.

11. A console apparatus for an information processing system according to claim 1, wherein said message analyzing means includes means for establishing said error occurrence of said information processing apparatuses when said received message from one of said information processing apparatuses includes one of a code and a character representing said error occurrence.

12. A console apparatus for an information processing system according to claim 1, wherein said message analyzing means includes means for establishing said reply request from said information processing apparatuses when said received message from one of said information processing apparatuses includes a reply request flag.

13. A console apparatus for an information processing system according to claim 1, wherein said message analyzing means includes means for establishing said reply request of said information processing apparatuses when said received message from one of said information processing apparatuses is identical to a reply request stored in advance upon comparison thereof.

14. A console apparatus for an information processing system according to claim 1, wherein said message analyzing means includes means for establishing said reply request from said information processing apparatuses when said received message from one of said information processing apparatuses includes one of a code and a character representing said reply request.

15. A console apparatus for an information processing system according to claim 1, wherein said display means includes means for displaying said messages stored in said memory means at said storage areas, on said display screen within said plurality of message windows provided in correspondence with said information processing apparatuses.

16. A console apparatus for an information processing system according to claim 15, wherein said display means includes means for displaying said detected special states of said information processing apparatuses on said display screen within an area different from said plurality of message windows.

17. A console apparatus for an information processing system according to claim 15, wherein said display means includes means for displaying said special state of said information processing apparatus on a window corresponding to said information processing apparatus.

18. A console apparatus for an information processing system having a plurality of information processing apparatuses comprising:

memory means, having a plurality of storage areas assigned to respective ones of said plurality of processing apparatuses for storing messages received from said respective ones of said plurality of information processing apparatuses in one of said storage areas assigned thereto;

message analyzing means for analyzing said received messages to detect, as special state of said plurality Of information processing apparatuses, a reply request issued from said information processing apparatuses to an operator of said information processing system and an error occurrence of said information processing apparatuses; and display means, including a display screen having a therein a status window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of said information processing apparatuses to said status window, wherein said display means includes means for displaying said messages stored in said memory means at said storage areas, on said display screen within said plurality of message windows provided in correspondence with said information processing apparatuses, wherein said display means further includes means for displaying said detected special states of said information processing apparatuses on said display screen within an area different from said plurality of message windows, and wherein said different area on said display screen for displaying said detected special states of said information processing apparatuses is a window divided into segmented areas corresponding to said information processing apparatuses.

19. A console apparatus for an information processing system according to claim 18, wherein said display means includes means for changing the color of said segmented area corresponding to one of said information processing apparatuses in accordance with the type of said detected special state of said one information processing apparatus.

20. A console apparatus for an information processing system having a plurality of information processing apparatuses, comprising:

first memory means, having a plurality of storage areas assigned to respective ones of said plurality of processing apparatuses, for storing messages received from said respective ones of said plurality of information processing apparatuses in one of said storage areas assigned thereto;

message analyzing means for analyzing said received messages to detect, as special state of said plurality of information processing apparatuses, a reply request issued from said information processing apparatuses to an operator of said information processing system and an error occurrence of said information processing apparatus;

second memory means, having a plurality of storage areas assigned to respective ones of said plurality of processing apparatuses, for storing the special states of said plurality of information processing apparatuses detected by said message analyzing means; and display means, including a display screen having therein a status window and a plurality of message windows, each of said message windows being assigned to respective ones of said plurality of processing apparatuses, for displaying said messages stored in said respective storage areas of said first memory means to a respective one of said message windows corresponding to said respective ones of said plurality of processing apparatuses, and for displaying notice information indicative of said special state stored in said second memory means of at least one of said information processing apparatuses to said status window.

21. A console apparatus for an information processing system according to claim 20, wherein said display means includes means for displaying said messages stored in said first memory means at said storage areas, on said display screen within the plurality of message windows provided in correspondence with said information processing apparatuses.

22. A console apparatus for an information processing system according to claim 21, wherein said display means includes means for displaying said detected special states of said information processing apparatuses on said display screen within an area different from said plurality of message windows.

23. A console apparatus for an information processing system having a plurality of information processing apparatuses, comprising:

first memory means, having a plurality of storage areas assigned to respective ones of said plurality of processing apparatuses, for storing messages received from said respective ones of said plurality of information processing apparatuses in one of said storage areas assigned thereto;

message analyzing means for analyzing said received messages to detect, as special states of said plurality of information processing apparatuses, a reply request issued from said information processing apparatuses to an operator of said information processing system and an error occurrence of said information processing apparatus;

second memory means, having a plurality of storage areas assigned to respective ones of said plurality of processing apparatuses, for storing the special state of said plurality of information processing apparatuses detected by said message analyzing means; and display means, including a display screen having therein a status window and a plurality of message windows, each of said message windows being assigned to respective ones of said plurality of processing apparatuses, for displaying said messages stored in said respective storage areas of said first memory means to a respective one of said message windows corresponding to said respective ones of said plurality of processing apparatuses, and for displaying notice information indicative of said special state stored in said second memory means of at least one of said information processing apparatuses to said status window;

wherein said display means includes means for displaying said messages stored in said first memory means at said storage areas, on said display screen within the plurality of message windows provided in correspondence with said information processing apparatuses, wherein said display means includes means for displaying sad detected special states of said information processing apparatuses on said display screen within an area different from said plurality of message windows, and wherein said different area on said shared display screen for displaying said detected special states of said information processing apparatuses is a window divided into segmented areas corresponding to said information processing apparatuses.

24. A console apparatus for an information processing system having a plurality of information processing apparatuses, comprising:

memory means, having a plurality of storage areas assigned to respective ones of said plurality of processing apparatuses, for storing messages received from said respective ones of said plurality of information processing apparatuses in one of said storage areas assigned thereto;

message analyzing means for analyzing said received messages to detect, as special state of said plurality of information processing apparatuses, a reply request issued from said information processing apparatuses to an operator of said information processing system and an error occurrence of said information processing apparatuses;

display means, including a display screen having therein a state window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of said information processing apparatuses to said status window;

command input means for inputting a command;

selecting means for selecting which of said information processing apparatuses said input command is destined; and command storage means for making said input command store in said memory means at one of said storage areas corresponding to said selected information processing apparatuses, wherein said display means includes means for displaying said command stored in said memory means and said memory of said selected information apparatus stored in said memory means, on said display screen at an area corresponding to said selected information processing apparatus.

25. A console apparatus for an information processing apparatus according to claim 24, wherein said display means includes means for displaying said reply request and said error occurrence detected by said message analyzing means as the special states of said information processing apparatuses.

26. A console apparatus for an information processing apparatus according to claim 25, further comprising means responsive to the display of one of said reply request and said error occurrence by said display means, for erasing one of said reply request and said error occurrence.

27. A console apparatus for an information processing apparatus according to claim 24, further comprising means for designating an area of said display screen on which the special state of said information processing apparatus is displayed, wherein said selecting means includes means for selecting said information processing apparatus corresponding to said designated area as a destination of said input command.

28. A console apparatus for an information processing apparatus according to claim 24, further comprising input means having keys provided in correspondence with said information processing apparatuses, wherein said selecting means includes means responsive to the activation of one of said keys for selecting said information processing apparatus corresponding to said activated key as a destination of said input command.

29. A console apparatus for an information processing apparatus according to claim 24, further comprising means for designating an area of said display screen on which the message of said respective information processing apparatus is displayed, wherein said selecting means includes means for selecting said information processing apparatus corresponding to said designated area as a destination of said input command.

30. A console apparatus for an information processing apparatus according to claim 24, wherein said display means includes means for displaying said messages stored in said memory means on said display screen at said plurality of message windows corresponding to said storage areas, positioning the one of said message windows corresponding to said selected information processing apparatus as a foremost window on said shared display screen, and displaying identification information of said information processing apparatus corresponding to said one message window as a foremost window on said shared display screen, on said display screen.

31. A console apparatus for an information processing apparatus according to claim 30, wherein said display means includes means for displaying identification information of said information processing apparatus corresponding to said one message window as a foremost window on said display screen, on said foremost window.

32. A console apparatus for an information processing apparatus according to claim 30, wherein said display means includes means for displaying identification information of said information processing apparatus corresponding to said one message window as a foremost window on said display screen, on said shared display screen at a different area from said foremost window.

33. A console apparatus for an information processing apparatus according to claim 30, further comprising memory means for storing said command input by said command input means.

34. A console apparatus for an information processing system having a plurality of information processing apparatuses, comprising:

memory means, having a plurality of storage areas assigned to respective ones of said plurality of processing apparatuses, for storing messages received from said respective ones of said plurality of information processing apparatuses in one of said storage areas assigned thereto, wherein said messages include reply requests issued from respective ones of said plurality of information processing apparatuses to an operator of said information processing system; and display means, including a display screen having therein a status window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of said information processing apparatuses to said status window as a foremost message window on said display screen.

35. A console apparatus for an information processing apparatus according to claim 34, wherein said display means includes means for displaying identification information of one of said information processing apparatuses corresponding to said foremost message window, on said foremost window.

36. A console apparatus for an information processing apparatus according to claim 34, wherein said display means includes means for displaying identification information of said information processing apparatus corresponding to said foremost message window, on said shared display screen at a different area from said foremost window.

37. A console apparatus for an information processing apparatus according to claim 34, wherein said display means includes means for displaying identification information of all of said information processing apparatuses corresponding to said plurality of message windows, on corresponding ones of said message windows.

38. A console apparatus for an information processing system having a plurality of information processing apparatuses, comprising:

a memory connected to said plurality of information processing apparatuses, having a plurality of storage areas each provided in correspondence with one of said plurality of information processing apparatuses and each for storing messages, including reply requests, provided from a corresponding one of said plurality of information processing apparatuses to an operator of said information processing system;

means connected to said memory for analyzing states of said plurality of information processing apparatuses, based upon messages held in said memory; and a display connected to said detecting means for displaying messages stored in said storage areas of said memory at message display areas provided in correspondence to said storage areas, and for displaying a state as analyzed by said analyzing means for at least one of said information processing apparatuses on said state display area, so as to enable recognition of said state at a glance.

39. A console apparatus for an information processing system having a plurality of information processing apparatuses, comprising:

memory means, having a plurality of storage areas assigned to respective ones of said plurality of processing apparatuses for storing messages received from said respective ones of said plurality of information processing apparatuses in one of said storage areas assigned thereto;

message analyzing means for analyzing said received messages to detect, as special states of said plurality of information processing apparatuses, a reply request issued from said information processing apparatuses to an operator of said information processing system and an error occurrence of said information processing apparatuses; and display means, including a display screen having a therein a state window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of said information processing apparatuses to said status window, wherein said state window is divided into a plurality of notice information areas including an identification information area, an under-operation area, an error message area and a reply request message.

40. A console apparatus for an information processing system having a plurality of information processing apparatuses, comprising:

first memory means, having a plurality of storage areas assigned to respective ones of said plurality of processing apparatuses, for storing messages received from said respective ones of said plurality of information processing apparatuses in one of said storage areas assigned thereto;

message analyzing means for analyzing said received messages to detect, as special states of said plurality of information processing apparatuses, a reply request issued from said information processing apparatuses to an operator of said information processing system and an error occurrence of said information processing apparatus;

second memory means, having a plurality of storage areas assigned to respective ones of said plurality of processing apparatuses, for storing the special states of said plurality of information processing apparatuses detected by said message analyzing means; and display means, including a display screen having a therein a status window and a plurality of message windows, each of said message windows being assigned to respective ones of said plurality o processing apparatuses, for displaying said messages stored in said respective storage areas of said first memory means to a respective one of said message windows corresponding to said respective ones of said plurality of processing apparatuses, and for displaying notice information indicative of said special state stored in said second memory means of at least one of said information processing apparatuses to said status window, wherein said state window is divided into a plurality of notice information areas including an identification information area, an under-operation area, an error message area and a reply request message.

41. A console apparatus for an information processing system having a plurality of information processing apparatuses, comprising:

memory means, having a plurality of storage areas assigned to respective ones of said plurality of processing apparatuses, for storing messages received from said respective ones of said plurality of information processing apparatuses in one of said storage areas assigned thereto;

message analyzing means for analyzing said received messages to detect, as special states of said plurality of information processing apparatuses, a reply request issued from said information processing apparatuses, to an operator of said information processing system and an error occurrence of said information processing apparatuses;

display means, including a display screen having therein a status window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of aid information processing apparatuses to said status window;

command input means or inputting a command;

selecting means for selecting which of said information processing apparatuses said input command is destined; and command storage means for making said input command store in said memory means at one of said storage areas corresponding to said selected information processing apparatuses, wherein said display means includes means for displaying said command stored in said memory means and said memory of said selected information apparatus stored in said memory means, on said display screen at an area corresponding to said selected information processing apparatus, and wherein said status window is divided into a plurality of notice information areas including an identification information area, an under-operation area, an error message area and a reply request message.

42. A console apparatus for an information processing system having a plurality of information processing apparatuses, comprising:

memory means, having a plurality of storage areas assigned to respective ones of said plurality of processing apparatuses, for storing messages received from said respective ones of said plurality of information processing apparatuses in one of said storage areas assigned thereto; and display means, including a display screen having therein a status window and a plurality of message windows, each of said message windows being assigned to respective ones of said plurality of processing apparatuses, for displaying said messages stored in said respective storage areas to a respective one of said message windows corresponding to said respective ones of said plurality of processing apparatuses, and for displaying notice information indicative of said special state of at least one of said information processing apparatuses to said status window as a foremost message window on said display screen, wherein said state window is divided into a plurality of notice information areas including an identification information area, an under-operation area, an error message area and a reply request message.

43. A console apparatus for an information processing system having a plurality of information processing apparatuses, comprising:

a memory connected to said plurality of information processing apparatuses, having a plurality of storage areas each provided in correspondence with one of said plurality of information processing apparatuses and each for storing messages provided from a corresponding one of said plurality of information processing apparatuses to an operator of said information processing system;

means connected to said memory for analyzing states of said plurality of information processing apparatuses, based upon messages held in said memory; and a display connected to said detecting means for displaying messages stored in said storage areas of said memory at message display areas provided in correspondence to said storage areas, and for displaying a state as analyzed by said analyzing means for at least one of said information processing apparatuses on said state display area, so as to enable recognition of said state at a glance, wherein said display comprises a state window having a plurality of notice information areas including an identification information area, and under-operation area, an error message area and a reply request message area.

* * * * *